Feb. 18, 1947. L. J. BERBERICH 2,416,143
INSULATING MATERIAL
Filed Aug. 22, 1941

WITNESSES:

INVENTOR
Leo J. Berberich.
BY
ATTORNEY

Patented Feb. 18, 1947

2,416,143

UNITED STATES PATENT OFFICE 2,416,143

INSULATING MATERIAL

Leo J. Berberich, Forest Hills, Pa., assignor to Westinghouse Electric Corporation, East Pittsburgh, Pa., a corporation of Pennsylvania Application August 22, 1941, Serial No. 407,934

7 Claims. (Cl. 154—2.6)

This invention relates to electrical insulating materials and, more particularly, to bonded laminated mica insulation.

The object of this invention is to provide a binder for mica flakes to produce a laminated electrical insulator which is elastic and non-flowing at elevated temperatures while maintaining a relatively low power factor.

Another object of the invention is to provide a composite electrical insulating tape embodying mica flakes which retains its flexibility at elevated temperatures.

Other objects of the invention will, in part, appear obvious and will, in part, appear hereinafter.

For a further object of the invention, reference is made to the following specification and drawing, in which.

Figure 1:
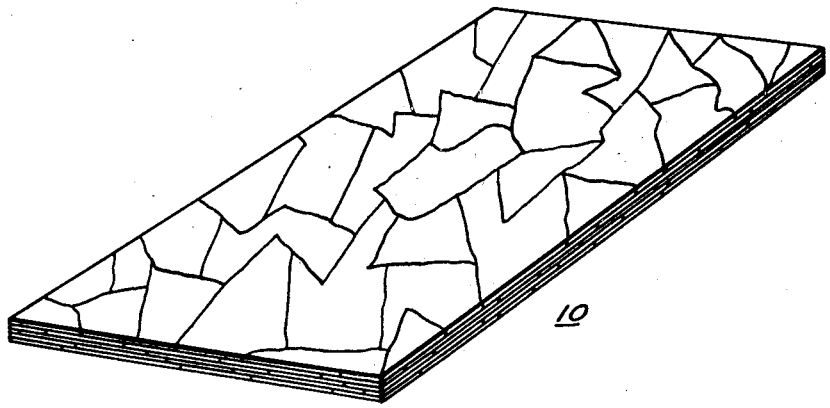
Figure 1 is a perspective view of a laminated sheet of mica.

In some types of electrical apparatus, such, for example, as railway motors, the apparatus may be subjected to short-time high temperatures of the order of 175° C. In the prior art, asphaltic types of bonded mica insulation have been employed in producing laminated electrical insulation suitable for this type of service. If the asphaltic material is subjected to temperatures of this order, it will begin to run out of the motor or other machine at temperatures below 175° C., particularly under the pressures produced by expansion of the metal and insulation and the centrifugal forces of rotation. This type of service is extremely severe upon the electrical insulation, and numerous failures have occurred due to the exudation of the binding material from the solid insulating portion.

Furthermore, the electrical insulation becomes increasingly unsatisfactory with elevated temperatures. For example, an asphalt bonded mica slot cell insulator with a power factor of 3 to 4% at 25° C. at a stress of 25 volts per mil increased in power to 12% at 100° C. at the same electrical stress. Accordingly, the insulating material rapidly becomes less efficient when loaded at high temperatures. Failure takes place at a rate disproportionate to the temperature rise due to cumulative heating.

It is additionally desirable that in electrical insulating composite material the binder possesses elastic properties whereby the natural expansion and contraction of magnetic core and windings may be compensated for by the elastic give of the binder. As the apparatus heats up in operation, the iron core and copper coil and insulation expand by different amounts and the binder will be subjected to shear stresses. An elastic binder will distort sufficiently to accommodate the normal expansion and contraction without undue stresses occurring and without harmful distortion of the insulation taking place.

In this invention it has been found that mica flakes may be bonded by means of a solventless mica binder that has the property of adhering to mica and possesses electrical insulating properties which are greatly superior, for example, to those of the prior art asphaltic type binder. The binder consists of monomeric styrene copolymerized with from 5% to 25% of the half ester of maleic acid and castor oil. The half ester of maleic acid with castor oil is a resin which may be dissolved in the monomeric styrene to produce an extremely fluid liquid suitable for application in the usual type of mica laying machine. The binder may be polymerized into a tough resin after application to the mica flakes by the use of both heat and a catalyst. For example, 0.2% of benzoyl peroxide as a catalyst may be added to the liquid binder, and thereafter the binder may be heated in an oven at 160° C. to cause polymerization of the binder.

As the proportion of maleic acid-castor oil ester to styrene is increased the power factor increases. For example, when tested at 1000 cycles, and 25° C. a 10% castor oil-maleic ester—90% styrene resin gave power factor values ranging from 0.13% to 0.24%, while a 25% castor oil-maleic acid ester—75% styrene gave power factor value ranging from 3% to 4%.

The hardness of the resin decreases with increasing proportions of the maleic acid-castor oil ester in the resin. The 25% ester addition produces a much more soft and flexible resin than the lower ester proportion resin.

Styrene homologues which form long chain polymers are as suitable as styrene for copolymerizing with maleic acid-castor oil half esters. The cross linking of the long polymer chain by the half ester produces the resin useful for this invention.

The liquid binder may be modified by the addition of a suitable plasticizer having substantially equivalent or similar electrical insulating properties as the resin. It has been found that monoamylnaphthalene and diamylnaphthalene, diphenyl oxide and other materials having substantially zero dipole moment may be added to the binder to produce effective plasticizing without causing a pronounced increase in the power factor. The plasticizer may be added in quantities ranging from effective amounts up to 15% to produce a bonded mica sheet which becomes extremely flexible with the greater proportion of plasticizer, particularly at room temperature.

The plasticizer is added to assure predetermined plasticity at room temperatures whereby application to apparatus is facilitated. The resin without plasticizer is sufficiently elastic at operating temperatures to accommodate all stresses normally encountered. Under excessively high temperature operating conditions the plasticizer may even volatilize from the binder without, however, impairing the effectiveness or functions of the binder.

In cases where the binder is relatively fluid and a more viscous binder is desired, for example, for use as a brushing type bond in applying a tape to a conductor, a small proportion of polystyrene may be added. Amounts up to 15% of polystyrene have produced successful results in increasing the viscosity of the liquid binder.

Figure 2:
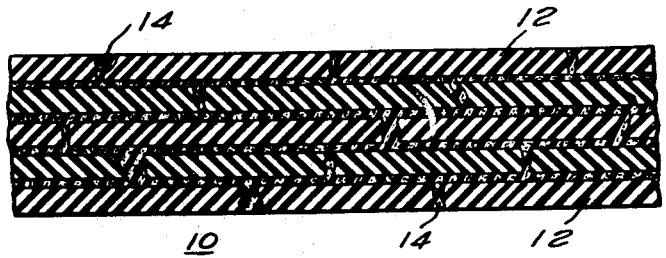
Fig. 2 is an enlarged fragmentary cross-sectional view of a portion of the sheet of Fig. 1.

Referring to Figure 1 of the drawing, there is shown a bonded mica sheet 10 comprising a plurality of small particles of mica cemented together by means of the composite binder produced by this invention. A greatly enlarged cross-section of the sheet 10 of bonded mica is shown in Fig. 2. The mica flakes 12 are cemented together by the binder 14 interposed between the adjacent laminations cementing the whole into a coherent body. A successful composition for the binder 14 is as follows:

| | Parts by weight |
|---|---|
| Monomeric styrene | 85 |
| Castor oil maleate | 10 |
| Diamylnaphthalene | 5 |
| Benzoyl peroxide catalyst | 0.2 |

The flakes of mica 12 with the fluid binder applied thereto are built up on a backing of 0.0004" paper. After the binder has been applied, the paper-backed mica sheet is placed between metal plates and a small pressure of the order of a few pounds per square inch applied. The compressed sheet is heated to 160° C. for two to three hours. The benzoyl peroxide catalyst and the heat will cause the fluid binder to copolymerize. It is believed that the maleic acid-castor oil half ester cross links the long polystyrene chains which tend to form and produce a resin which appears to have thermosetting rather than thermoplastic properties.

A sample member of resin alone was found to support its own weight and showed no signs of plastic flow at 250° C. Furthermore, the thermosetting copolymer produced becomes slightly elastic or rubbery at temperatures above 80° C. The resin will stretch and return to normal shape as pressure is applied and removed. Accordingly, the properties of the resin binder are such that, when subjected to mechanical stresses in electrical apparatus operating at temperatures above 80° C., the resin will give, and when the stresses are removed, the resin binder will return to normal shape without the laminated insulation failing. This is a highly desirable feature for this type of laminated insulation.

A mica sheet prepared as shown in Fig. 1 had the following dielectric characteristics at 60 cycles and 27° C.:

| Volts/mil | Power factor, per cent |
|---|---|
| 25 | 0.5 |
| 50 | 0.5 |
| 75 | 0.6 |
| 100 | 0.8 |
| 125 | 1.6 |

Since machine insulation is seldom operated at over 75 volts per mil, the insulation has a remarkably flat power factor curve within usual operating ranges.

The change of power factor with temperature at 60 cycles and 25 volts per mil are shown in the following table:

| Temperature, ° C. | Power factor, per cent |
|---|---|
| 27 | 0.85 |
| 50 | 1.8 |
| 80 | 1.9 |
| 120 | 3.8 |

The corresponding power factor values for asphaltic bonded mica range from 3%–4% at 25° C. to 10–12% at 100° C.

Figure 3:
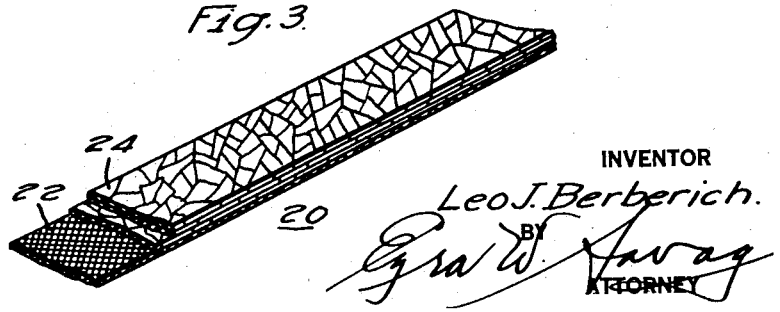
Fig. 3 is a perspective view of a portion of a flexible tape.

Referring to Fig. 3 of the drawing, there is shown a tape 20 consisting of a fabric base 22 and a plurality of flakes of mica 24 applied thereto, the whole being consolidated by means of the styrene-maleic acid-castor oil resin. The fabric tape 22 may consist of ordinary cotton woven material. For certain uses where strength at elevated temperatures is important, it may be desirable to employ woven fiber glass cloth for the tape 22, or in some cases, asbestos tape. Other fabrics may be employed as the case demands. For many purposes a paper backing is as satisfactory as cloth and may be preferred because it is cheaper and thinner.

The tape 20 of Fig. 3 may be prepared as follows:

A convenient method of preparation consists in covering a wide sheet of fabric or paper 22 with a plurality of layers of mica flakes laid by hand or by machine upon an initial coating of the liquid binder upon the sheet 22. Upon each successive layer of mica flakes, an additional coating of the binder is applied. The final layer of mica flakes need not be coated with binder. The binder in the tape may be copolymerized by heating between plates at 160° C. for two to three hours. A flexible tape suitable for numerous electrical uses is thus produced.

The average breakdown strength for a sheet of mica bonded with the resin was 1580 volts per mil for a 24 mil sheet. Asphalt bonded material of the same thickness and tested under identical conditions had a breakdown strength of from 950 to 1050 volts per mil. The mica sheets may be successfully employed at temperatures up to 250° C. for short periods without any perceptible exudation of the resin binder. The sheet of mica with the binder may be distorted elastically, but it will not distort plastically to take a permanent set.

It will be appreciated that the binder has a particularly important advantage over the present day binding materials, such as shellac in alcohol solution, in that the binder does not have a solvent present requiring evaporation. The styrene acts as a solvent for the maleic acid-castor oil ester and on copolymerization, the styrene carrier forms an integral part of the binder.

In preparing the maleic acid-castor oil ester, both maleic acid and maleic anhydride may be used. It is particularly desirable to employ only half molar proportions of the castor oil to the maleic anhydride or maleic acid in causing the reaction. The homologues of maleic acid, for example, citraconic acid or citraconic anhydride may be employed as equivalents of maleic acid. The reaction between castor oil and maleic acid is well known in the art and need not be detailed herein.

There are numerous possible uses for the materials prepared and shown in Figs. 1 and 3. Slot cell and coil insulation, particularly for the long coils in high voltage generators, is a particularly advantageous application for the material, since the elongation and differential expansion and contraction of the coils under temperature cycles is relatively great. An elastic bond of the type herein disclosed will permit such elongation to take place without harmful effect on the composite mica insulation.

Commutator segments may be insulated from each other by the sheet 10 shown in Fig. 1. Sheets may be molded or formed to meet various motor insulation requirements, while the binder is in the liquid state. It is not feasible to mold the material to a shape after the binder has set.

The tape 20 in Fig. 3 may be wrapped about coils. Such tape is also useful in fastening electrical members such as generator stator windings firmly to base structures to prevent vibration and harmful distortion. When glass tape is used as a base for the tape 20, the strength of the material is sufficient to provide for the most severe mechanical requirements.

In applying tapes to a conductor by means of a binder or adhesive which is to be brushed on a more viscous brushing binder is desired to obviate excessive dripping.

A brushing type binder suitable for the purpose of a plurality of layers of tape to each other and to the conductor is prepared from:

| | Parts by weight |
|---|---|
| Monomeric styrene | 70 |
| Castor oil maleate | 10 |
| Diamylnaphthalene | 5 |
| Polystyrene | 15 |
| Benzoyl peroxide catalyst | 0.2 |

The polystyrene makes the solution more viscous. It may be varied in amount from the percentage given to meet requirements. In some cases, indene or cyclopentadiene polymers may be added instead of polystyrene in order to increase the viscosity of the binder. A somewhat greater quantity of the latter polymers should be added, as compared to the amount of polystyrene, to produce a given degree of viscosity.

Numerous other uses of the invention will be obvious to those skilled in the art, and it is desired that the specification and drawing be interpreted as illustrative and not in a limiting sense.

I claim as my invention:

1. Laminated electrically insulating material comprising mica flakes and a bonding agent for the mica flakes, the bonding agent comprising the reaction product of styrene and the half ester of maleic anhydride and castor oil, the laminated material being capable of withstanding high temperatures without flowing and having a low power factor at the high temperatures.

2. A laminated electrically insulating material capable of withstanding temperatures of 175° C. without exudation comprising mica flakes and a binder for the mica flakes, the binder comprising the reaction product of 5 parts to 25 parts of the maleic acid half ester of castor oil and from 95 to 75 parts of styrene, the laminated material having a low power factor up to 175° C. at 60 cycles at stresses of 75 volts per mil thickness.

3. A laminated electrically insulating material capable of withstanding temperatures of 175° C. without exudation comprising mica flakes and a binder for the mica flakes, the binder comprising the reaction product of 5 parts to 25 parts of the maleic acid half ester of castor oil and from 95 to 75 parts of styrene and a plasticizer composed of an organic compound of substantially zero dipole moment to produce predetermined elasticity in the binder to compensate for thermal contraction and expansion when in use in apparatus, the laminated material having a low power factor up to 175° C. at 60 cycles at stresses of 75 volts per mil thickness.

4. A laminated electrically insulating tape which comprises, in combination, a base material, a layer of mica on the base material, and a binder for the mica and the base material to consolidate the whole, the binder comprising the reaction product of styrene with the maleic acid half ester of castor oil.

5. A laminated electrically insulating tape which comprises, in combination, a base material, a layer of mica on the base material, and a binder for the mica and the base material to consolidate the whole, the binder comprising the reaction product of 75 to 95 parts of styrene with the 5 to 25 parts of maleic acid half ester of castor oil.

6. A laminated electrically insulating tape which comprises, in combination, a base material, a layer of mica on the base material, and a binder for the mica and the base material to consolidate the whole, the binder comprising the reaction product of 75 to 95 parts of styrene with the 5 to 25 parts of maleic acid half ester of castor oil, and a plasticizer composed of an organic compound of substantially zero dipole moment to produce a predetermined plasticity in the laminated tape.

7. Laminated electrically insulating material comprising mica flakes and a bonding agent for the mica flakes, the bonding agent comprising the reaction product of styrene and the half ester of an unsaturated organic dibasic acid selected from maleic acid and its homologues, and castor oil, the laminated material being capable of withstanding high temperatures without flowing and having a low power factor at the high temperatures.

LEO J. BERBERICH.

REFERENCES CITED

The following references are of record in the file of this patent:

UNITED STATES PATENTS

| Number | Name | Date |
|---|---|---|
| 2,195,254 | Miller | Mar. 26, 1940 |
| 1,984,671 | Daimler | Dec. 18, 1934 |
| 2,195,362 | Ellis | Mar. 26, 1940 |

FOREIGN PATENTS

| Number | Country | Date |
|---|---|---|
| 366,354 | British | Feb. 4, 1932 |